United States Patent [19]
Peterson et al.

[11] Patent Number: 5,744,701
[45] Date of Patent: Apr. 28, 1998

[54] ELECTRONIC LIQUID LEAK DETECTOR

[75] Inventors: Daniel E. Peterson, Northfield; Dana R. Lonn, Minneapolis; Walter J. Petersen, Eden Prairie, all of Minn.

[73] Assignee: The Toro Company, Minneapolis, Minn.

[21] Appl. No.: 375,760

[22] Filed: Jan. 20, 1995

[51] Int. Cl.$^6$ .................................................. G01M 3/26
[52] U.S. Cl. ..................................... 73/49.2; 73/40
[58] Field of Search ............................ 73/49, 2 T, 313, 73/317, 318, 319, 40, 49.2 R; 364/509, 510

[56] References Cited

U.S. PATENT DOCUMENTS

| | | | |
|---|---|---|---|
| 1,768,446 | 6/1930 | Gron . | |
| 2,253,260 | 8/1941 | Alcorn | 200/84 |
| 2,318,066 | 5/1943 | Dodd | 103/6 |
| 2,604,522 | 7/1952 | Monroe | 177/311 |
| 2,625,042 | 1/1953 | Binford | 73/299 |
| 2,825,895 | 3/1958 | Malagarie | 340/244 |
| 3,152,478 | 10/1964 | Hughes et al. | 73/308 |
| 3,303,785 | 2/1967 | Pearce | 103/25 |
| 3,438,247 | 4/1969 | Lotti et al. | 73/40 |
| 3,478,688 | 11/1969 | Lind | 103/25 |
| 3,538,745 | 11/1970 | Wright et al. | 73/49.2 |
| 3,568,705 | 3/1971 | Boyadjieff | 137/87 |
| 3,576,959 | 5/1971 | Bogosoff | 200/84 |
| 3,667,605 | 6/1972 | Zielinski | 210/170 |
| 3,673,587 | 6/1972 | Baruch | 340/244 |
| 3,685,531 | 8/1972 | Byford | 137/101.11 |
| 3,708,245 | 1/1973 | King | 417/13 |
| 3,726,070 | 4/1973 | Klosterman et al. | 56/294 |
| 4,020,481 | 4/1977 | Nakagawa | 340/244 |
| 4,057,700 | 11/1977 | Nakashima | 200/84 C |
| 4,090,396 | 5/1978 | O'Brien | 73/46 |
| 4,152,925 | 5/1979 | Lindh | 73/40 |
| 4,161,957 | 7/1979 | Schoellkopf | 137/205 |
| 4,274,328 | 6/1981 | Pedersen | 91/445 |
| 4,321,590 | 3/1982 | Ishikawa et al. | 340/515 |
| 4,325,894 | 4/1982 | Date et al. | 261/66 |
| 4,353,245 | 10/1982 | Nicolai | 73/49.2 |
| 4,361,835 | 11/1982 | Nagy | 340/624 |
| 4,380,243 | 4/1983 | Braley | 137/312 |
| 4,398,186 | 8/1983 | Statz | 340/616 |
| 4,440,017 | 4/1984 | Barton et al. | 73/40.5 |
| 4,480,610 | 11/1984 | Stinson | 123/196 |
| 4,505,148 | 3/1985 | Zajac | 73/49.2 |
| 4,513,774 | 4/1985 | Reid | 137/392 |

(List continued on next page.)

FOREIGN PATENT DOCUMENTS

| | | | |
|---|---|---|---|
| 399367 | 10/1942 | Italy . | |
| 55-5448218 | 11/1980 | Japan | 73/49.2 |
| 58-198726 | of 1982 | Japan . | |
| 347458 | 8/1960 | Switzerland | 73/49.2 |
| 28903 | 12/1912 | United Kingdom . | |
| 315568 | 7/1928 | United Kingdom . | |
| 2003723 | 9/1978 | United Kingdom . | |

*Primary Examiner*—Ronald L. Biegel
*Attorney, Agent, or Firm*—Merchant, Gould, Smith, Edell, Welter & Schmidt, P.A.

[57] ABSTRACT

A leak detector apparatus 10 is disclosed which measures changes in fluid level in a tube 54 substantially located within a reservoir 29 of hydraulic fluid. The tube 54 has a first end which is open to the atmosphere and a second end which is submerged in the hydraulic fluid. The reservoir 29 is selectively sealed, therefore changes in the volume of the fluid within the reservoir 29 cause the fluid level within the tube 54 to change in accordance with the principles of a manometer. A measuring device is utilized to determine the level of the fluid within the tube 54, wherein the measurement device can include a float 22 having a magnet 23 located thereon interacting with a linear array of Hall effect sensors 24. A controllable venting valve 28 is provided through the reservoir 29 to equalize the pressure within the tank with the external ambient pressure. The opening and closing of the venting valve 28 is controlled by an electronic controller device 30 that uses float position and hydraulic fluid temperature as inputs, among others. Accordingly, the float position can be reset within the tube to extend the range, thereby creating a virtual column.

34 Claims, 10 Drawing Sheets

U.S. PATENT DOCUMENTS

| | | | |
|---|---|---|---|
| 4,522,109 | 6/1985 | Marchi et al. | 91/420 |
| 4,522,167 | 6/1985 | Hurner | 123/196 |
| 4,549,429 | 10/1985 | Kurt | 73/40 |
| 4,563,674 | 1/1986 | Kobayashi | 340/620 |
| 4,571,987 | 2/1986 | Horner | 73/49.2 |
| 4,590,462 | 5/1986 | Moorehead | 340/605 |
| 4,591,837 | 5/1986 | Martinez | 340/605 |
| 4,604,893 | 8/1986 | Senese et al. | 73/49.2 |
| 4,610,165 | 9/1986 | Duffy et al. | 73/317 |
| 4,611,620 | 9/1986 | Wang | 137/100 |
| 4,637,254 | 1/1987 | Dyben et al. | 73/314 |
| 4,732,035 | 3/1988 | Lagergren et al. | 73/49.2 |
| 4,750,775 | 6/1988 | Miller | 296/38 |
| 4,773,265 | 9/1988 | Baillie et al. | 73/305 |
| 4,775,855 | 10/1988 | Cox | 340/605 |
| 4,781,057 | 11/1988 | Hyfantis, Jr. et al. | 73/49.2 |
| 4,796,469 | 1/1989 | Brown et al. | 73/49.2 |
| 4,804,944 | 2/1989 | Golladay et al. | 340/624 |
| 4,811,601 | 3/1989 | Tolan | 73/29 |
| 4,827,762 | 5/1989 | Hasselmann | 73/49.2 |
| 4,848,150 | 7/1989 | Baird et al. | 73/49.2 |
| 4,852,054 | 7/1989 | Mastandrea | 364/509 |
| 4,961,064 | 10/1990 | Hara | 338/231 |
| 4,987,769 | 1/1991 | Peacock et al. | 73/49.7 |
| 5,000,044 | 3/1991 | Duffy et al. | 73/317 |
| 5,021,665 | 6/1991 | Ames | 20/357.1 |
| 5,035,141 | 7/1991 | Baird et al. | 73/49.2 |
| 5,107,699 | 4/1992 | Mastandrea | 73/49.2 |
| 5,156,042 | 10/1992 | Carlin et al. | 73/49.2 |
| 5,187,973 | 2/1993 | Kunze et al. | 73/40.5 |
| 5,196,824 | 3/1993 | Helm | 340/450.3 |
| 5,254,976 | 10/1993 | Schueler | 340/605 |
| 5,315,529 | 5/1994 | Farmer | 364/509 |
| 5,402,110 | 3/1995 | Oliver et al. | 73/49.2 |
| 5,421,193 | 6/1995 | Carlin et al. | 73/314 |
| 5,565,687 | 10/1996 | Berrill | 73/314 |

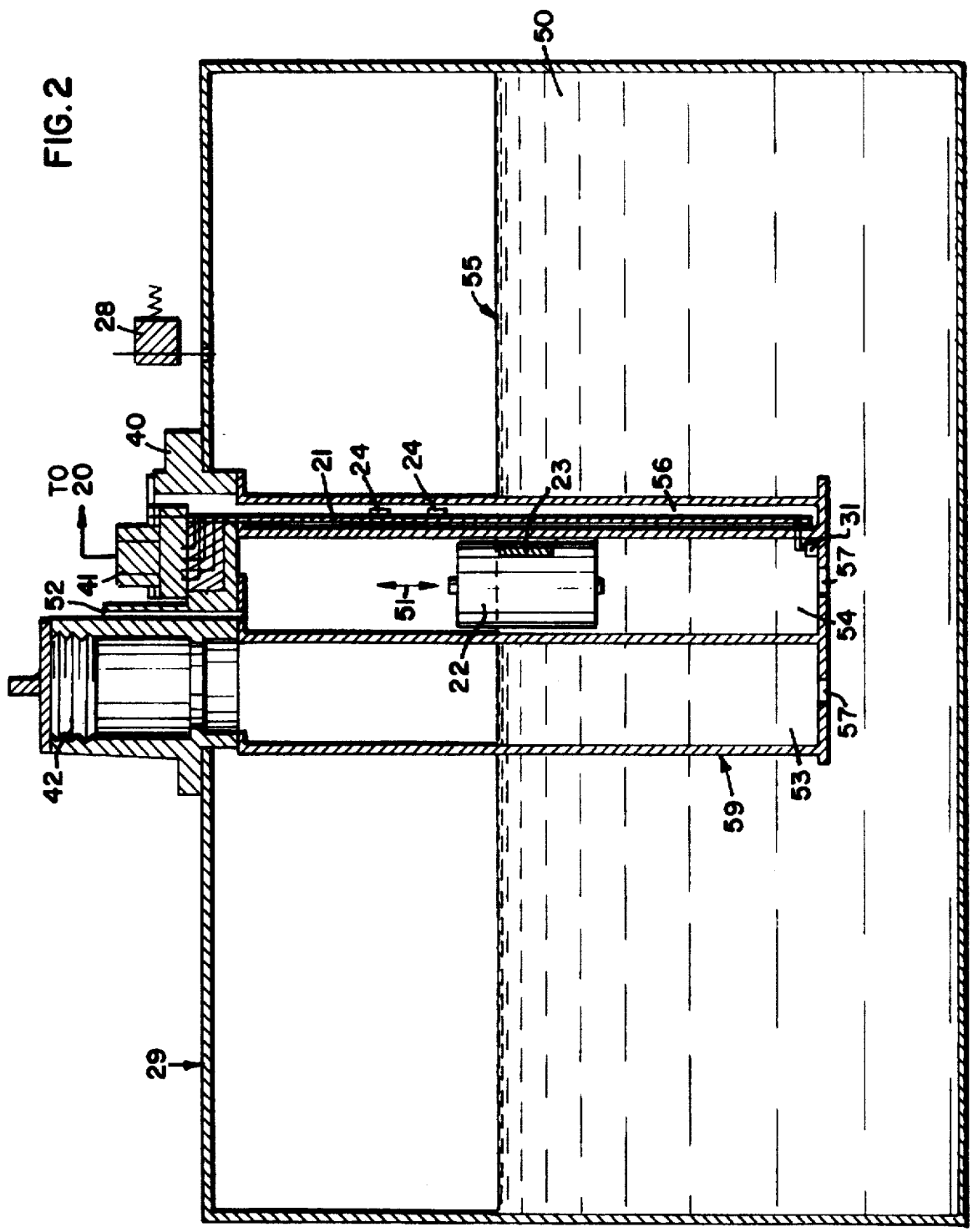

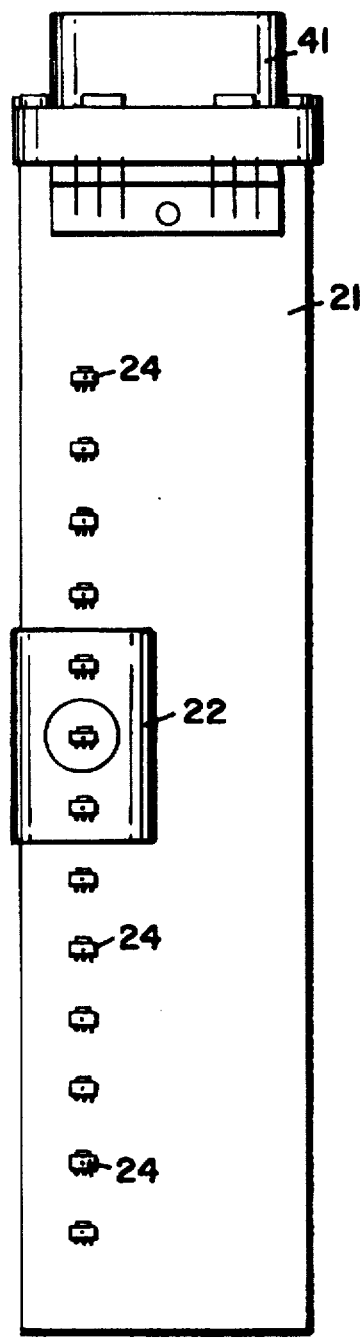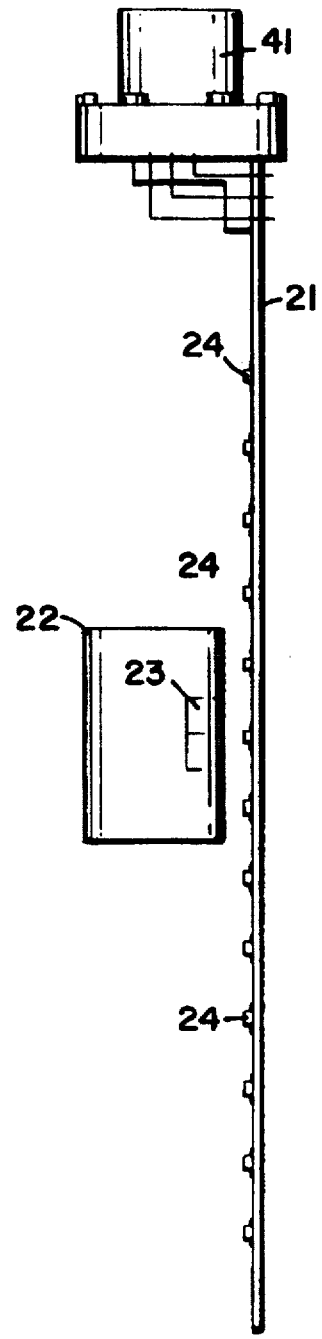

ELECTRONIC LIQUID LEAK DETECTOR

FIELD OF THE INVENTION

The present invention relates to a measuring device; more particularly to an electronic liquid level and volume detector; and more particularly still to a method and apparatus for determining changes in the volume of hydraulic fluid in a reservoir, of the type utilized on turf maintenance vehicles, whereby hydraulic fluid leaks may be detected.

BACKGROUND OF THE INVENTION

Many turf maintenance vehicles employ hydraulic fluid systems to provide power for devices requiring energy or motive power. By way of example, turf maintenance vehicles which include cutting reels may utilize hydraulic cylinders to raise and lower the cutting reels, may use hydraulic motors to power the cutting reels themselves, and hydraulics may be used in connection with power assisted steering. Additionally, many turf maintenance vehicles utilize hydraulic transmission systems to propel the vehicle.

Hydraulic fluid leak detector systems alert the operator of the turf maintenance vehicle when a condition exists which suggests that a leak has occurred. Such leaks may present difficulties in the operation of the vehicle. Also, hydraulic fluid is destructive to the turf being mowed/maintained.

In the past, there have been several attempts to measure and monitor the hydraulic fluid level within a reservoir or cylinder. One example is disclosed in U.S. Pat. No. 4,591,837 issued to Martinez. This reference discloses utilization of an external expansion chamber for the hydraulic fluid. A float chamber pipe and float are located within the expansion chamber. As the hydraulic fluid expands, it flows into an open end of the expansion chamber and float chamber pipe. The float monitors the expansion level of the fluid such that if the fluid level drops below a predetermined position, then the float also drops and activates a signal assembly. However, a drawback of this device is that it assumes that contractions are a leak no matter what the cause (i.e., thermal cool down of the oil may result in a fluid level drop).

Another hydraulic fluid leak detector is disclosed in U.S. Pat. No. 5,254,976. This reference discloses monitoring a pressure equalization flow rate between first and second chambers to detect leaks. In this system, if the flow persists in excess of a predetermined period of time, then a leak condition is assumed and an alarm is triggered.

Other references which disclose various methods for detecting fluid levels include U.S. Pat. Nos. 4,321,590 issued to Ishikawa et al. and 4,773,265 issued to Baillie et al.

It is also known in the art to utilize Hall effect cells to detect liquid levels. For example, U.S. Pat. Nos. 4,361,835 issued to Nagy and 4,804,944 issued to Golladay et al. illustrate floats with magnets located thereon interacting with one or more Hall effect sensors. The Nagy reference includes a plurality of Hall effect sensors which are sequentially polled to determine whether first or second magnets are located at a vertical height corresponding to one of the plurality of Hall sensors. One drawback of these disclosed devices, however, is that no application of fluid level change is utilized to provide for a significant differentiation of small changes in fluid volume. Also, there is no controllable element to provide for precise measurement of large volume changes due to operation of the various elements of the devices being powered cylinders or rams).

Therefore, there arises a need for a method and apparatus for accurately determining the volume change of a liquid within a reservoir chamber. Further, there arises a need for a method and apparatus which provides for accurate measurement of both small and large volume changes. The present invention directly addresses and overcomes the shortcomings of the prior art.

SUMMARY OF THE INVENTION

The preferred liquid level detector apparatus and method constructed in accordance with the principles of the present invention is particularly useful for detecting a loss of fluid from a reservoir (or system connected to a reservoir). It includes means for amplifying and measuring the change in fluid volume within a reservoir and also includes determining means to interpret the measurements and to discern if a leak condition is present.

According to the principles of the present invention, the invention measures the level of oil in a column. The column acts as a manometer with one end submersed in the liquid in the reservoir and the second end open to the ambient atmosphere. Air located in the reservoir and above the liquid is compressed when the oil expands (e.g., the oil expands as it heats during use). As the air is compressed, the level of the oil in the column rises. Conversely, when the oil cools or is lost/leaks, the air is less compressed and the level of the oil in the column drops. It will be appreciated that the rise and fall of the oil in the column can be readily correlated to the expansion and contraction of the oil volume in the reservoir. Two examples of methods used to detect leak conditions include the absolute change in fluid level in the column (volume in the reservoir) or the rate of change of fluid level in the column (volume in the reservoir).

The principles of the present invention include providing a manometer type tube through the surface of the liquid and extending it to the ambient/external atmosphere. By reducing the free surface through the use of a relatively small column, the volume changes of the oil within the reservoir are amplified within the column. Further, by selectively opening a vent in the reservoir to the external ambient atmosphere, the air pressure above the oil within the reservoir may be normalized to the ambient pressure (either in whole or in part). Thus, the level of fluid within the column will return to a more mid-scale reading. By storing these changes, a virtual column is created which amplifies small changes in oil volume and yet which is capable of tracking large changes in oil volume during the course of operation.

One preferred leak detector apparatus constructed in accordance with the principles of the present invention is mounted in a reservoir. Using the example of a turf maintenance vehicle, the reservoir may be represented by a tank which is substantially sealed to the external ambient atmosphere and which is partially filled with hydraulic fluid. An elongated column or tube is provided and has a first (upper) end and a second (lower) end. The first end of the tube is open to the external atmospheric pressure and the second end is submersed in the fluid. A float is slidably located within the tube and is arranged and configured to have a buoyancy whereby the float accurately positions itself at the top of the level of hydraulic fluid within the tube. A magnet is cooperatively mounted on the float and a temperature sensor is located in the tube.

Mounted in a generally opposing, vertical position to the tube is a series of Hall effect sensors. Upon interaction with the magnet as it moves past these sensors, the current float position, and thereby the level of the oil within the column, can be determined. As discussed above, the level of oil within the column can be related to the air pressure above the oil in the tank, which in turn allows a determination of the change in the volume of the oil required to create the pressure. It will be appreciated by those skilled in the art that while a float/magnet interacting with Hall effect sensors is used in the preferred embodiment to provide the functionality of measuring the level of the oil in the column, such method is only one of several types of methods which might be used. For example, ultrasonic devices, reed switches, etc. might also be used.

Although the tank is normally sealed, excluding the first or open end of the tube, a fluid communication means with a controllable venting valve is provided through the tank. In the preferred embodiment, the controllable venting valve extends through the top surface of the tank. When the valve is opened, the controllable fluid communication means allows air to move into or out of the tank to equalize the pressure within the tank with the external ambient pressure. Therefore, air above the fluid within the tank may be released or replenished by opening the venting valve. The opening and closing of the venting valve is controlled by an electronic controller device that uses the float position and hydraulic fluid ("oil") temperature as inputs, among others.

One feature of the present invention is the amplification of oil volume changes. More specifically, by making the tube relatively small, a small volume change in the tank is amplified. This creates a situation where an accurate and identifiable change in the oil column height in the tube can be measured. It will be appreciated by those skilled in the art that the desired volume of the tube may be determined by the volume of oil used in the cylinders, etc. of the turf maintenance vehicle. For example, if large changes in oil volume require a large number of vent openings ("resets"), a secondary tube might be utilized to increase the column volume (discussed below). Alternatively, the tube can be resized in other manners to reduce the number of resets.

One feature of the present invention is that the use of an electronic controller allows the measuring range to be extended beyond the actual length of the tube. This is accomplished through the use of resets and provides for the calculation and creation of an unlimited virtual oil level column.

Another feature of the present invention is that oil temperature measurements are used to modify the virtual volume by considering thermal expansion. This provides a more accurate measurement. Additionally, by considering temperature, reductions in oil volume due to thermal cool down can be discerned in order to eliminate false leak alarms.

Still another feature of the present invention is that other machine information may be communicated to the leak detector from a second electronic controller unit/device (ECU). Such information may include mode of operation information. It will be appreciated by those skilled in the art the such operations can cause normal volume changes in the reservoir. Accordingly, this information can lead to increased precision of the measurements.

Another feature is the provision of a secondary tube located adjacent the first primary tube which allows for an adjustment of the volume of the first tube, and therefore, the amount that the hydraulic fluid column level will move under a given pressure. Therefore, the same device can be utilized in a variety of applications which utilize a differing number of hydraulic devices and/or volume of oil. In the preferred embodiment, it has been found useful to size the tube volume such that machine demand does not cause resets. As will be appreciated by those skilled in the art, when the vent is open, any changes in oil volume cannot be detected. Accordingly, the number and duration of resets are minimized and resets cannot occur during a machine caused demand (i.e., when the volume may change due to extension of a cylinder, etc.).

Therefore, according to one aspect of the present invention, there is provided an apparatus for measuring the fluid volume in a reservoir having at least one wall, comprising: a) a first column having a first end and a second end, wherein said first end extends through the reservoir and is in fluid communication with the external atmosphere, and wherein said second end extends beneath the surface of the fluid and is in fluid communication with the fluid; b) measuring means for measuring the level of the fluid within said first column; c) controllable fluid communication means, located through a wall of the reservoir, for selectively venting the atmosphere within the reservoir to the external atmosphere; and d) wherein the air pressure within the reservoir moves toward equilibrium with the external atmosphere when said controllable fluid communication means vent, whereby any elevated or decreased levels of fluid within said first column may be normalized and said column operates as a virtual column.

According to another aspect of the invention there is provided is provided an apparatus for measuring volume changes of hydraulic fluid in a reservoir tank, of the type utilized on a turf maintenance vehicle, the apparatus comprising: a) a reservoir tank having a one or more sides and a top, said tank containing fluid which defines a first volume of air between the surface of the fluid and said sides and top of said tank; b) a first column, said first column having a first end extending through said reservoir, wherein said first column is in fluid communication with external atmosphere, and a second end arranged and configured to be located below the surface of the fluid level within said tank, whereby changes in the fluid volume in the tank increase or decrease the first volume of air thereby changing the air pressure which varies the fluid level within said first column; c) measuring means for measuring the level of fluid within said first column and for generating a detect signal responsive to the level of fluid in said first column; d) processing means for receiving said detect signal, wherein the level of the hydraulic fluid within said first column is determined, and for determining changes in the fluid volume; and e) controllable fluid communication means, located through said tank, for venting the atmosphere within said tank to the external atmosphere, wherein the pressure between the two tends to equalize, whereby any elevated or decreased levels of fluid within said first column may be normalized and said first column is operable as a virtual column.

According to another aspect of the invention there is provided an apparatus for measuring the fluid volume in a reservoir having at least one wall, comprising: a) a first column having a first end and a second end, wherein said first end extends through the reservoir and is in fluid communication with the external atmosphere, wherein said second end extends beneath the surface of the fluid and is in fluid communication with the fluid and wherein said first column is substantially located within the reservoir; b) measuring means for measuring the level of the fluid within said first column; and c) wherein said column is sized and configured to reduce the free surface of the fluid within the reservoir in order to amplify changes in fluid volume, wherein small volume changes of fluid within the reservoir can be detected by said measuring means.

According to another aspect of the invention there is provided a hydraulic fluid system for a turf maintenance vehicle, comprising: a) a reservoir for hydraulic fluid; b) a pump in fluid communication with said reservoir; c) a valve system for selectively placing hydraulic fluid from said pump in fluid communication with a work piece; d) a return system for returning hydraulic fluid from said work pieces to said reservoir; e) a first column having a first end and a second end, wherein said first end extends through the reservoir and is in fluid communication with the external atmosphere, and wherein said second end extends beneath the surface of the fluid and is in fluid communication with the fluid; f) measuring means for measuring the level of the fluid within said first column; and g) controllable fluid communication means, located through a wall of the reservoir, for venting the atmosphere within the reservoir to the external atmosphere; and h) wherein the pressure within the reservoir moves toward equilibrium with the external atmosphere, whereby any elevated or decreased levels of fluid within said first column may be normalized and said column operates as a virtual column.

While the invention will be described with respect to a preferred embodiment turf maintenance vehicle, and with respect to particular components used within the leak detector apparatus, it will be understood that the invention is not to be construed as limited in any manner by either such environment, configuration or components described herein. Further, while the preferred embodiment of the invention will be described in relation to a hydraulic fluid environment, it will be understood that the scope of the invention is not so limited. The principles of this invention apply to the measurement of changes in fluid level within a system and the creation of a resettable virtual measurement device.

These and other various advantages and features which characterize the invention are pointed out with particularity in the claims annexed hereto and forming a part hereof. However, for a better understanding of the invention, its advantages and objects obtained by its use, reference should be had to the Drawing which forms a further part hereof and to the accompanying descriptive matter, in which there is illustrated and described a preferred embodiment to the invention.

BRIEF DESCRIPTION OF THE DRAWING

Referring to the Drawing, wherein like numerals represent like parts throughout the several views:

FIG. 2 is a cross-sectional view of the leak detector 10 illustrated in FIG. 1.

FIGS. 3A and 3B illustrate a portion of FIG. 2, showing the physical orientation of the float, magnet, and Hall effect sensors in greater detail.

DETAILED DESCRIPTION

As mentioned above, the principles of this invention apply to a liquid level/volume detector. One preferred environment of the invention is for use in connection with a turf maintenance vehicle to detect hydraulic fluid leaks.

In the preferred embodiment, the liquid level detector is used in connection with a turf maintenance vehicle having a plurality of reel mowers which are raised, lowered and powered by a hydraulic fluid system. An example of such a system is illustrated and described in commonly assigned and copending U.S. patent application Ser. No. 08/249,098, filed May 23, 1994. Such application is incorporated herein by reference.

Figure 8:
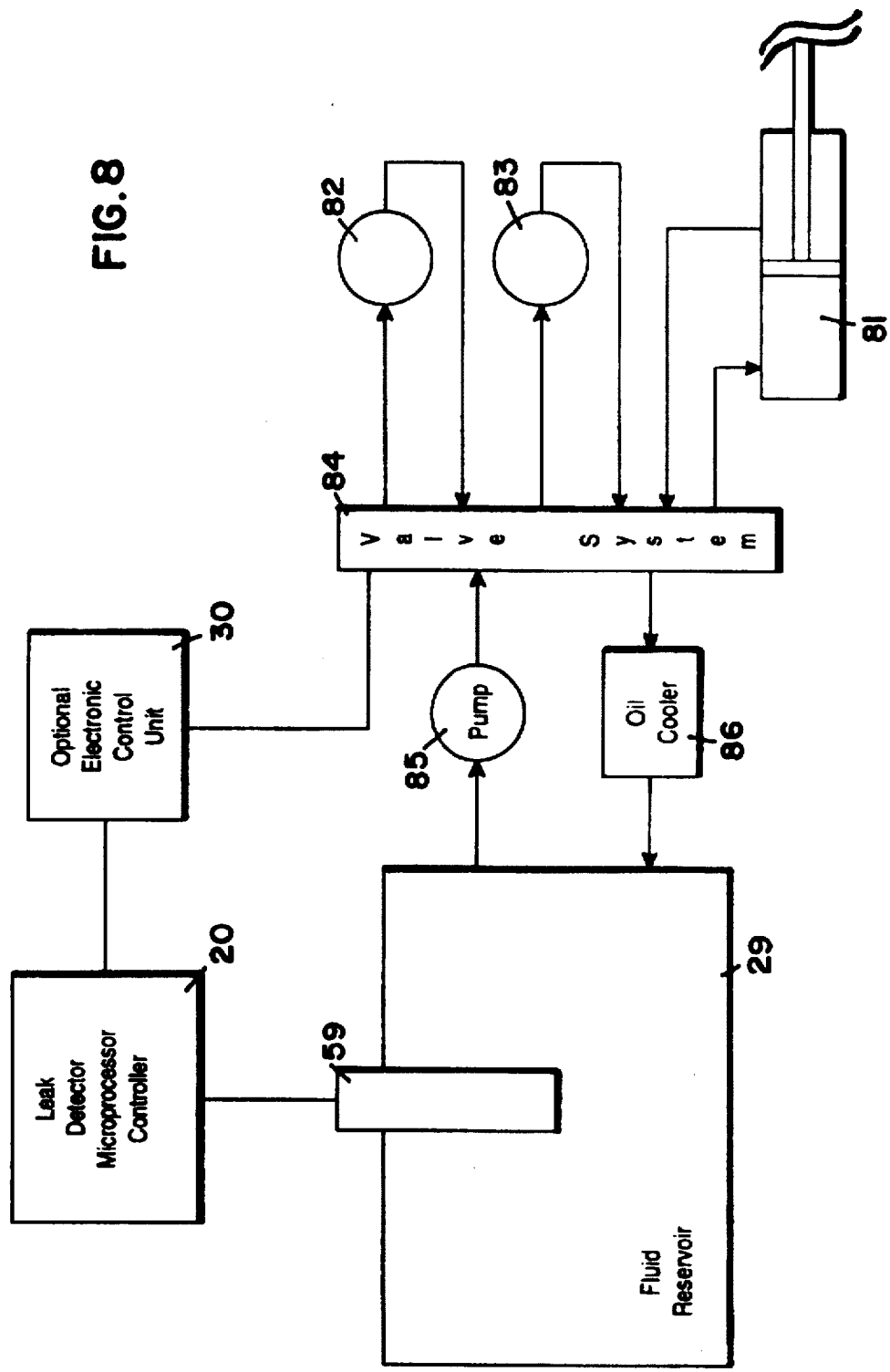
FIG. 8 illustrates a hydraulic fluid system environment in which the present invention may be utilized.

FIG. 8 illustrates a preferred example hydraulic system environment in which the leak detector 10 might be employed. Pump 85 is in fluid communication with a reservoir 29 of hydraulic fluid. A valve system 84 (which may be manually operated or electronically via optional electronic control unit 30 ("ECU")) coordinates the distribution of the hydraulic fluid to work pieces 81, 82, 83. The work pieces can include: blade/reel motors 82, traction motors 83, and/or lift cylinders 81. The valve system 84 also returns the hydraulic fluid from the work pieces through an optional oil cooler 86 to the reservoir 29. A housing 59 for various elements of the leak detector 10 resides substantially within the reservoir 29 and a controller 20 is operatively connected to elements within the housing 59.

A. Functional Blocks

Figure 1:
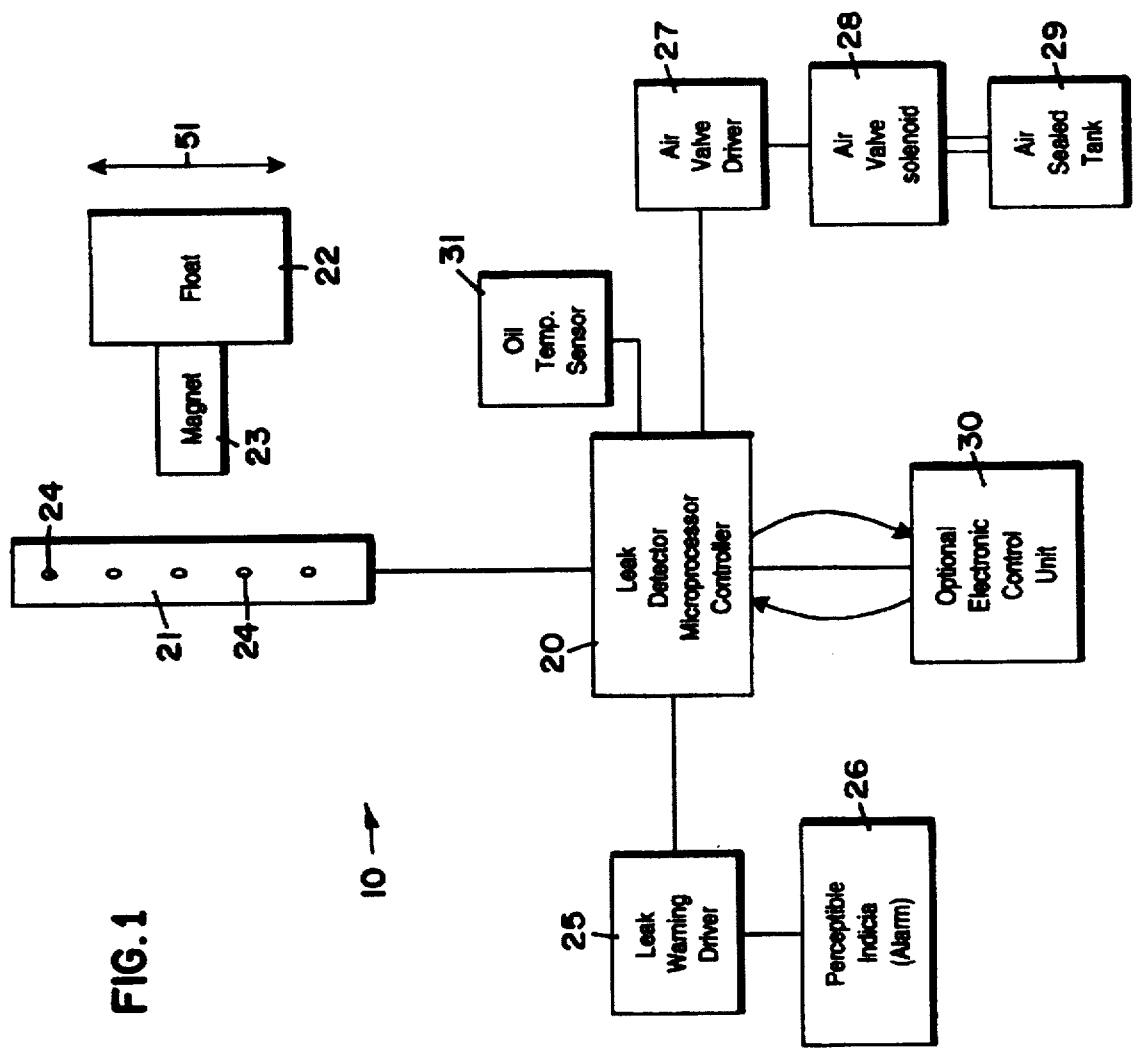
FIG. 1 is a functional block diagram illustrating the various functional blocks of the electronic liquid level detector constructed in accordance with the principles of the present invention.

Turning now to FIG. 1, a block diagram of the functional components of a device constructed in accordance with the principles of the present invention are presented. First, the leak detector microprocessor based controller block 20 is connected to a printed circuit board 21 having a plurality of Hall effect sensors 24 mounted in a generally linear manner. The Hall effect sensors 24 are physically located within a sealed column within the hydraulic fluid reservoir 29 (best seen in FIG. 2). Second, the controller block 20 is operatively connected to an oil temperature sensor 31 located within the first column or tube 54 (best seen in FIG. 2). Third, the controller block 20 is connected to the leak warning driver 25 which drives perceptible indicia block 26. The perceptible indicia of such block 26 can include alarms, horns, buzzers, lights, or other indicia which will alert an operator that a hydraulic fluid leak may be occurring. Finally, leak detector controller block 20 is connected to the air valve driver 27 which selectively activates the air valve solenoid 28 to either release or replenish air in order to normalize the air pressure within the reservoir 29 to the external ambient atmosphere. The solenoid is illustrated in FIG. 1 as being connected to the reservoir 29 by double lines to better illustrate a fluid communication between the ambient external environment and the reservoir 29. Those skilled in the art, however, will appreciate that while the air valve solenoid 28 acts to change the pressure within the reservoir 29, the first end of second column 54 is always maintained open to the atmosphere via vent 52.

Optional electronic control unit block 30 is illustrated as providing information to the controller block 20. This may be done to provide additional information to the leak detector controller 20 (e.g., such as instructions regarding devices currently in use within the hydraulic environment). Additionally, the leak detector controller block 20 can pass error and/or other data messages (e.g., oil level and temperature information) back to the optional electronic control unit block 30. Such message sharing implements a multiple controller area network ("CAN") environment.

In the preferred embodiment, the microprocessor controller 20 is an Intel MCS-96 family microcontroller. This controller determines the level of oil in the column by determining the position of the float, determines the volume of oil, determines the temperature of the oil, determines if there is a leak, signals via an alarm if a leak occurs, allows column height to be reset if the oil is either too low or too high, communicates information to the CAN data bus, and receives machine state information (i.e., information which includes cylinder oil usage, etc.) from the CAN network if available.

Float 22 floats on the fluid level within the float chamber 54 (best seen in FIG. 2). Float block 22 includes a magnet 23 located thereon which interacts with the Hall effect sensors 24 in a known manner. Float 22 moves in a vertical direction as illustrated by the line designated 51 such that at least one Hall effect sensor is selectively activated based on the level of the float within the float chamber 54. It will be appreciated that the use of a generally linear row of sensors 24 provides a digital representation of the level of hydraulic fluid within the column. By sensing one or two sensors, the height of the fluid in the column can be measured to an accuracy of one-half of the sensor spacing. In the preferred embodiment, thirteen (13) sensors are used 4/10 inch apart. Accordingly, a 2/10 inch resolution is achieved. The magnet is sized and configured such that if the magnet is located between two sensors, then both are activated. Also in the preferred embodiment, at least one sensor must always be turned on, otherwise a fault condition is signaled. It will be appreciated that for greater accuracy, a second row of sensors might be provided with an offset from the first row.

B. Preferred Physical Embodiment

Turning now to FIG. 2, tank 29 is illustrated as including a fluid, wherein the fluid level within tank 29 in FIG. 2 is illustrated by the line designated by 55. It will be appreciated by those skilled in the art that the volume of the fluid varies by the actuation of the various hydraulic cylinders, pumps, and motors on the turf maintenance vehicle best seen in FIG. 8. Further, the volume changes as the fluid thermally expands and contracts. This changes the pressure of the air trapped above the fluid in the tank 29. The change in pressure causes the float 22 (illustrated as residing within first column 54) to move up and down vertically as the fluid level varies in the column 54. The column 54 is located within housing 59.

Located external to the first column 54 is a sealed chamber 56 which extends substantially adjacent and parallel to first column 54. Printed circuit board 21 is contained within chamber 56. Printed circuit board 21 is illustrated as including a plurality of Hall effect sensors 24 (described above) which are operatively connected to the electronic control block 20.

Secondary chamber 53 also formed within housing 59 is utilized as a filling chamber to replenish hydraulic fluid within tank 55 and is sealed by plug 42. Sealing the entire opening of the top of tank 29 is a gasket 40 (described further below).

It will be appreciated by those skilled in the art that the leak detector can be assembled so that the secondary column 53 may be part of first column 54 or may be part of the tank 29 as well. Also illustrated in FIG. 2 is the location of electric solenoid valve 28.

Figure 5:
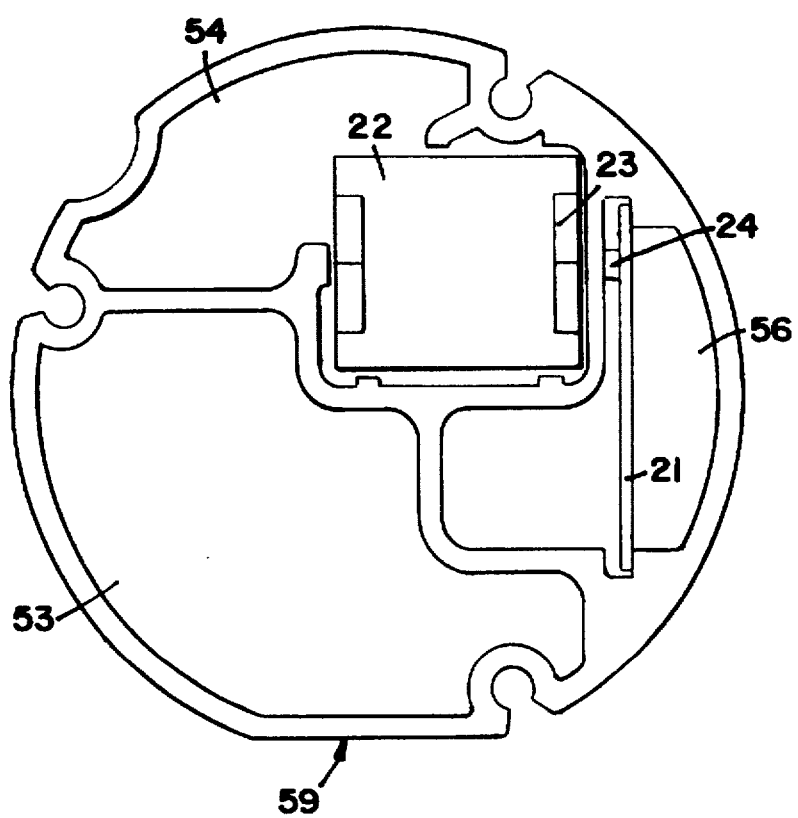
FIG. 5 is a cross-section of the primary and secondary columns 54 and 53 respectively.

As alluded to above, the preferred leak detector 10 has a three cavity or column housing 59 (best seen in FIGS. 2 and 5). One cavity 56 houses the electronics board. This board is potted into the housing. The first cavity 54 is the primary float column. The second cavity 53 is the auxiliary or secondary column. In some applications, the first and second cavities are combined to act as an enlarged float cavity. It is desirable, in order to insure the accuracy of the leak detector, that the volume of oil required by the machine to support cylinder motion not exceed the volume of oil in the column 54 (or also including secondary column 55). A slight loss in accuracy may occur during each reset cycle due to the discrete measurement capacity of the device. Therefore, in the preferred embodiment, reset cycles are limited to occur during warm up and cool down periods of the oil. It will be appreciated by those skilled in the art, however, that the provision of dual cavities allows the leak detector to be used on a variety of different machines and minimize resets.

In the preferred embodiment, the column size was determined based on several factors. These factors included a desire to limit the size and physical height of the housing 59 to the height of the tank 29 in order to be self-contained. Another factor was the goal of maximizing amplification while minimizing resets due to normal operation of devices on the turf maintenance vehicle. Accordingly, the volume of oil that the turf maintenance vehicle consumes in normal use preferably is taken into consideration. By way of example, the tank 29 may be a 10 gallon reservoir and the first column 54 may have a volume of approximately 20 cubic inches. In this environment, the column has an 8 inch usable linear measurement range.

Figure 6A:
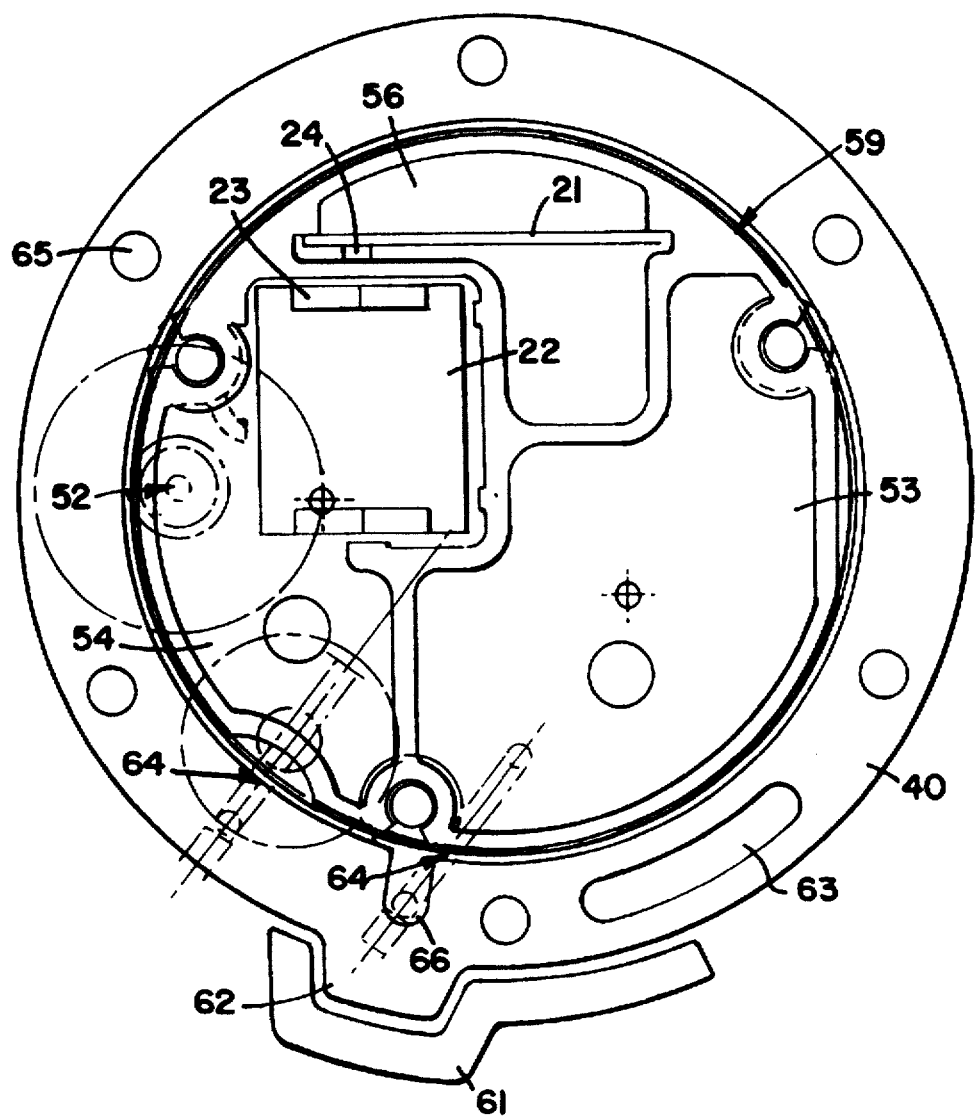
FIGS. 6A and 6B illustrate the housing 59, reversible gasket 40, and tank 29.
Figure 6B:
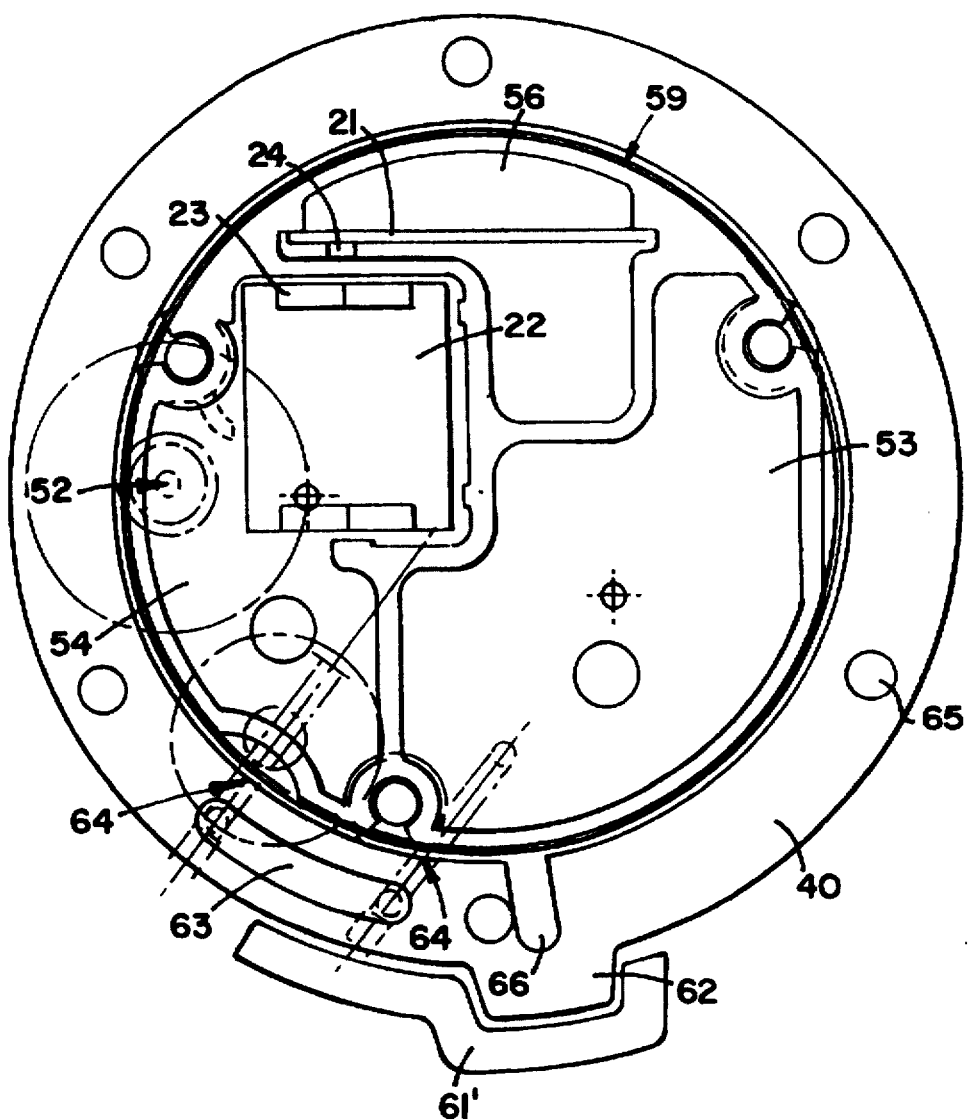

Now referring to FIGS. 2, 6A and 6B, the leak detector 10 is mounted onto the oil reservoir tank 29 with a reversible gasket 40. An alignment tab 62 on the gasket (best seen in FIGS. 6A and 6B) allows the gasket 40 to fit only one way in production (due to a mating indentation 61, 61' on the tank 29 for the tab 62). The orientation of the gasket automatically selects whether or not the second column 53 is a part of the tank 29 or is a part of the first column 54. If the second column 53 is to be used as a part of the first column 54, slot 63 allows the top of second column 53 to also be vented to the external ambient atmosphere.

By turning the gasket 40 over to mate with indentation 61, 61' the slot 63 selectively provides fluid communication via channels 64 between first column 54 and second column 53. FIG. 6B illustrates the columns 53, 54 in fluid communication. FIG. 6A illustrates the columns 53, 54 as not being in communication with one another. Slot 66 in FIG. 6A connects the second column 53 with the rest of the tank 29. Through holes 65 are provided to secure the assembly to the tank 29.

The second ends of the columns, which are submerged in the oil, have openings 57 where oil can enter into both first 54 and second 53 columns. The first end of the first column is exposed to the external environment. The top of the housing 59 includes an 18 pin connector 41 (which carries all of the electronic I/O), an air venting valve, a hydraulic oil fill plug 42, and a vent to atmosphere 52 (allowing air into first column 54 or both columns 53, 54).

FIGS. 3A and 3B illustrate the preferred physical orientation of the float 22, magnet 23 and sensors 24 in greater detail. FIG. 5 illustrates a cross section of the housing 59 taken through the float 22 and magnet 23.

C. Program Logic

Figure 4A:
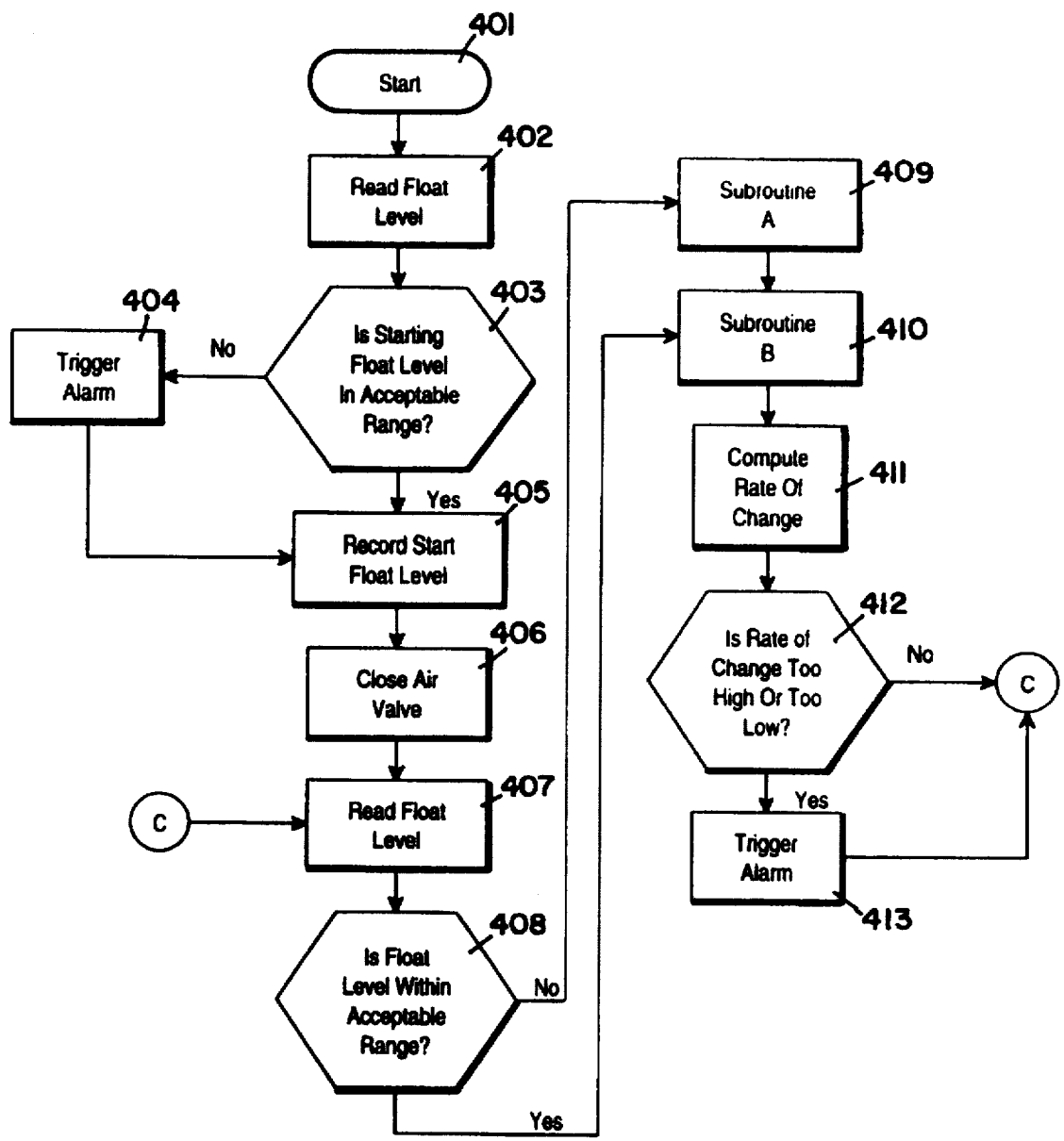
FIGS. 4A and 4B are logic flow diagrams illustrating program logic of the controller 20 utilized in connection with the present invention.
Figure 4B:
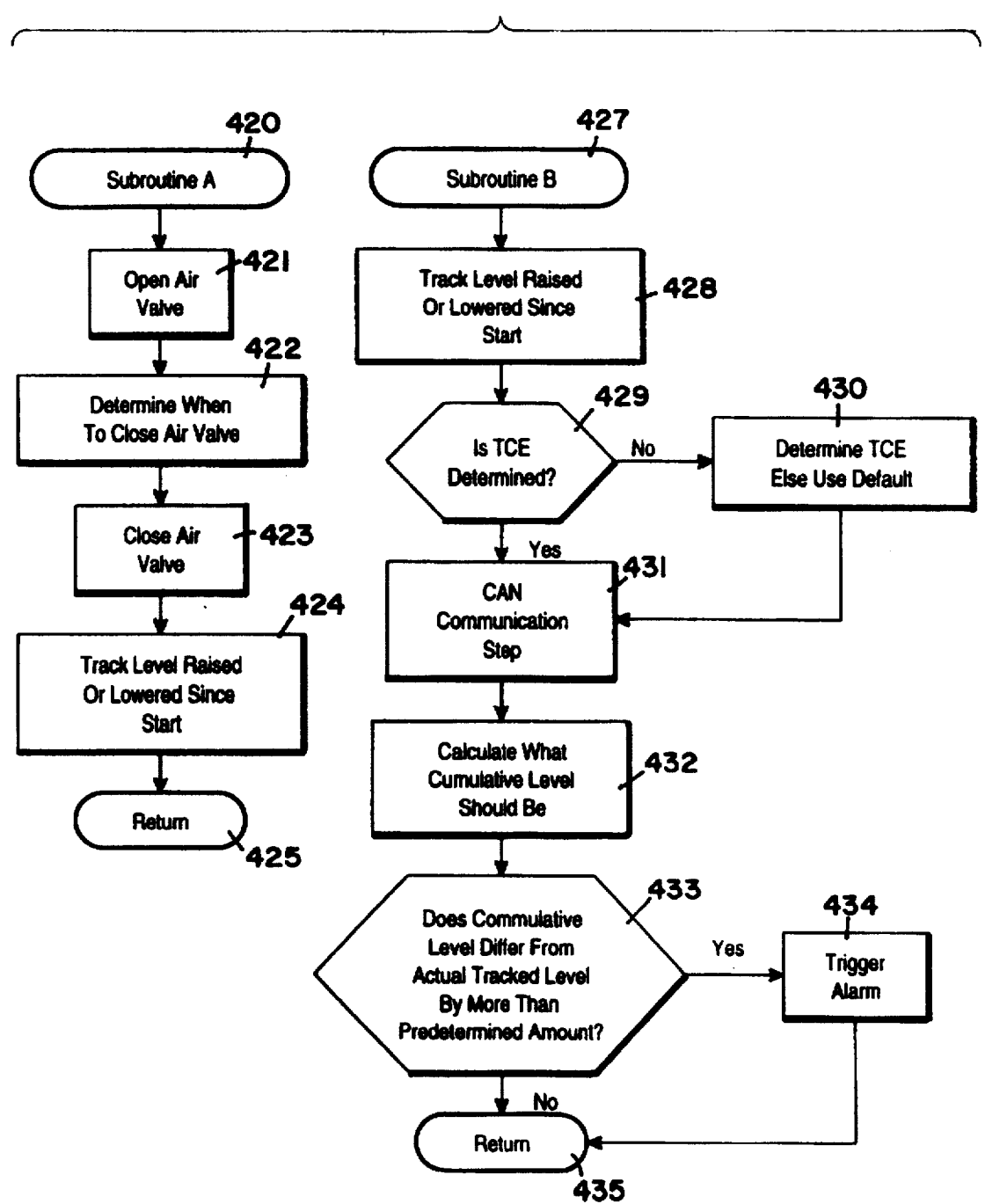

Turning now to FIGS. 4A and 4B, a logical flow diagram of the program logic of controller block 20 is presented. Although processor 20 will be characterized as "proceeding" from logical block to logical block in connection with this logical flow diagram and while describing the operation of the program logic, those skilled in the art would appreciate that programming steps are being acted on by microprocessor based controller block 20.

The Logic flow operation begins at block 401 and proceeds to block 402 where the float 22 level within first column 54 is determined by determining the Hall effect sensor(s) 24 which is being disturbed by the location of the magnet 23 on float 22. Proceeding to block 403, the processor 20 determines if the starting float level is in an acceptable range. If it is not, an alarm 26 is triggered at block 404, before proceeding to block 405. If the starting float level is in an acceptable range, processor 20 proceeds immediately to block 405 where the float level is recorded.

At block 406, the air valve 28 is then ordered to close by sending a command from the controller 20 to the air valve driver 27 which in turn closes the air valve solenoid 28. The defined air volume in tank 29 above the fluid is then sealed.

At block 407 the float level is again read and the controller 20 proceeds to block 408 to determine whether the float level has risen or fallen along line 51 to a set point where adjustment of the virtual manometer is required. If the float 22 has moved outside of an acceptable range such that adjustment is required, the controller block 20 moves to block 409 where subroutine A is implemented (FIG. 4B). As noted above, resets may be otherwise limited to certain time periods in order to enhance the accuracy of the leak detector 10.

Subroutine A starts at block 420 and proceeds to block 421 when an open air valve command is given. At block 422 controller block 20 then determines when to close the air valve 28 and proceeds to close the air valve 28 at block 423. During the logic flow process from blocks 421 to 423, the float's 22 movement with the magnet 23 relative to the Hall effect sensors 24 is determined in order to calculate the accumulated level change. This step is illustrated by block 424. At block 425 the subroutine returns to block 409.

The processor 20 then proceeds to block 410 where subroutine B is performed (FIG. 4B). Subroutine B starts at block 427 and the processor 20 proceeds to block 428 where the accumulated float level since the start is determined. At block 429, the thermal coefficient of expansion ("TCE") is determined for the current thermal reading from oil temperature sensor 31. If the TCE has not been determined for the current temperature, the controller block 20 proceeds to block 430 to determine the TCE. If the current TCE is accurate, the controller block 20 proceeds to optional block 431 where information is communicated and/or received from the optional ECU 30.

At block 432 the cumulative change in level 51 is calculated. The controller block 20 then moves to block 433. At this block, a comparison is made between the cumulative level and the actual tracked level. If the two numbers are larger than a predetermined amount (absolute value), then the controller block 20 moves to block 434 where an alarm 26 is triggered before proceeding to block 435. However, if the cumulative level does not differ, then the program operation proceeds directly to block 435 where the subroutine B ends and processor returns to block 410.

Proceeding to block 411, the rate of change of the level of oil within the column is calculated. Next at block 412, processor 20 determines whether this rate of change is too high or too low. In the event that it is too high or too low, an alarm 26 is triggered at block 413 before proceeding to block 407 to again read the flow level. However, if the rate of change is not too high or low, processor 20 proceeds directly to block 407.

It will be appreciated by those skilled in the art that the program operation may be suspended asynchronously via an interrupt by the operator, may otherwise end based on operation of power to the leak detector 10, or may be a continuous loop. Additionally, a reset (not shown) to turn off the alarm is also preferably provided in connection with the processor 20.

D. In Operation

In operation, until the turf maintenance vehicle is powered up, the venting valve 28 is open to the atmosphere. This allows the leak detector 10 to record an initial liquid level 55. This initial value can be used to determine if the amount of fluid in the tank 29 is acceptable for operation of the vehicle. If it is outside the acceptable range, the operator can be signaled by sounding the warning buzzer (i.e., perceptible indicia 26). The air valve 28 is then closed upon vehicle start up causing the tank 29 to be sealed except for the first end of the first column 54 above the float 22 via inlet 52. This forces any change in the oil volume (caused either by expansion or contraction due to temperature, oil used in cylinders, or fluid leaks) to be exhibited as a movement up and down the first column 54.

The controller block 20 periodically samples the height of oil in the column 54 via the Hall effect sensors 24 and keeps track of the oil height in the column 54. Should the level of oil in the column 54 become too high or too low (overflow or underflow of the column), the controller 20 will open the air valve 28, allowing the oil height in the column 54 to lower or raise accordingly, and then close the valve 28 at an appropriate time. In the preferred embodiment, the atmosphere is adjusted in small incremental steps to keep the time period in which the vent 28 is open to a minimum. For example, in the preferred embodiment, the vent 28 remains open for approximately 1/10 of one second. This time period generally corresponds to a 1/10 inch adjustment of the float 27 level. The controller 20 keeps track of this height change, and adds the reset height change to the measured level. A cumulative or virtual column height is thus computed.

As the oil 50 warms up and expands, the float 22 moves up the column 54 and the controller block 20 continuously tracks the virtual column height. If the float 22 goes down, one of three factors could be the cause. First, the machine could be demanding oil to fill the cylinders for lifting and lowering cutting units. The additional oil is demanded by the volume differential in the cylinder because of the rod volume. Second, the oil could be cooling down because the machine load is going down. This will cause the oil to contract. Third, a leak could be occurring. By comparing the virtual level to the expected level, the controller block 20 determines if a leak exists. If a condition exists where a leak may exist, an alarm 26 may be directly turned on, or optionally an alarm signal may be transmitted to an optional ECU 30 for recording the leak condition and/or triggering an alarm.

If an optional ECU 30 is available on the vehicle, the state of the hydraulic cylinders 81 (best seen in FIG. 8) may be supplied to the leak detector 10. By knowing this information, the leak detector 10 can add back volume which is being used by the vehicle to keep track of the expected level. This will allow more precision and detection of smaller leaks.

The leak detector circuit board 21 also measures the current oil temperature via an analog channel. The controller block 20 uses the temperature and the thermal expansion rate of the oil to determine the expected oil level. The expansion rate is based on a "default" expansion rate for hydraulic fluids or a "learned" expansion rate. The "default" is pre-programmed into the leak detector 10. The "learned" expansion rate is learned when the leak detector calculates the rate from the virtual column height change over a suitable change in temperature. The software determines which expansion rate to use (i.e., at block 430).

Additionally, if an optional ECU 30 is attached, other information may be passed back and forth such as failure codes and absolute oil level.

E. Working Example

Figure 7:
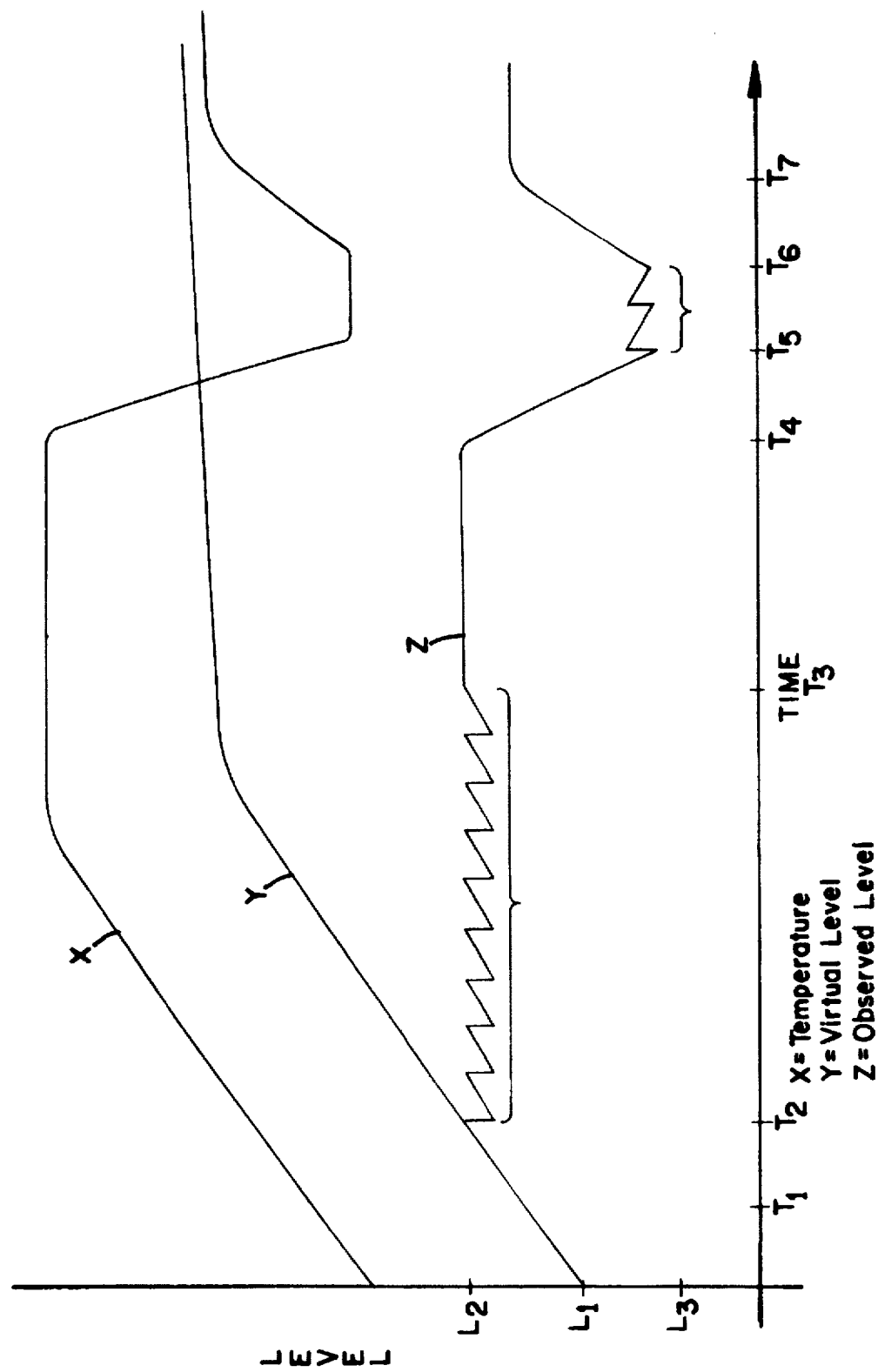
FIG. 7 is a graph illustrating the observed and virtual oil levels measured by the preferred device.

The following working example is illustrated in FIG. 7.

1. At time $T_0$, the oil level starts with the oil in the middle of the leak detector 10 range (e.g., $L_1$). This level is checked by processor 20 to be within the nominal range which has been established for the vehicle. If the oil level is outside the range, the alarm 26 is sounded.

2. At time $T_2$, as the machine begins to run, the temperature of the oil begins to rise (illustrated by line "X"). This causes the float 22 to rise in the first column 54 indicating the apparent change in volume.

3. The processor 20 measures the temperature and watches this apparent rise in the level. The processor 20 determines a computed temperature coefficient of expansion. This information is used to modify the default (preprogrammed) coefficient of expansion.

4. If the vehicle moves cylinders 81 or rams which demand oil from the reservoir 29, the apparent level will decrease.

5. At $T_2$, as the temperature continues to rise, the air valve 28 is opened, air is let out of the tank 29 and the observed level (line Z) goes down. The reduced observed level is then added to a computed "virtual" level.

6. This process continues until the machine reaches operating temperature ($T_3$ and $L_2$).

7. If the oil cools down ($T_4$), which may occur because the load is reduced, or the vehicle has to leave the fairway to idle in rough to wait for a golfer, the temperature falls and the observed level goes down.

8. If the observed level falls below the lower limit ($L_3$) of the first column 54, the air valve 28 is again opened allowing air into the tank 29 and the observed level rises ($T_5$). The amount gained is not added to the "virtual" level, but instead is accumulated for comparison to the virtual level. When the observed level is compared with the virtual level a factor is also added to the "virtual" level which is a correction for any temperature cool down effects. Accordingly, the level is corrected to a constant temperature for evaluation of a leak.

9. If a leak occurs, oil is taken from the tank 29 to make up for the oil which is leaking out. In this event, the observed level falls. To determine if it is a leak, the virtual level and the rate at which the float 22 goes down is monitored. If the rate exceeds the maximum which is possible for the current application (due to cooling) and/or the temperature is not observed as going down, a leak condition is signaled. If the "virtual" level goes down beyond the established tolerance then a leak is signaled.

10. If no leak occurs, the "virtual" level remains constant.

It will be appreciated that while many methods of reviewing the virtual and observed level might be used. The two used in the preferred embodiment are:

2. $\frac{dL}{dT}$ > maximum value during a period of time

For example, in the preferred embodiment, a typical bounding value for a rate of change may be 12° F./minute.

It is to be understood that even though numerous characteristics and advantages of the present invention have been set forth in the foregoing description, together with details of the structure and function of the invention, the disclosure is illustrative only and changes may be made in detail, especially in matters of the supporting hardware and software routines and data structures, and to the full extent indicated by the broad general meaning of the terms in which the appended claims are expressed.

What is claimed is:

1. An apparatus for measuring the fluid volume in a reservoir having at least one wall, comprising:
    a) a first column having a first end and a second end, wherein said first end extends through the reservoir and is in fluid communication with the external atmosphere, and wherein said second end extends beneath the surface of the fluid and is in fluid communication with the fluid;
    b) measuring means for measuring the level of the fluid within said first column;
    c) electrically controllable fluid communication means, located through a wall of the reservoir, for selectively venting the atmosphere within the reservoir to the external atmosphere; and
    d) wherein the air pressure within the reservoir moves toward equilibrium with the external atmosphere when said controllable fluid communication means vent, whereby any elevated or decreased levels of fluid within said first column may be normalized and said column operates as a virtual column.

2. The apparatus of claim 1, wherein said measuring means includes a float slidably engaged within said first column, wherein said float moves within said column in response to changes of volumes of fluid within the reservoir.

3. The apparatus of claim 2, wherein said measuring means further includes:
    a) a magnet cooperatively connected to said float; and
    b) a plurality of sensing devices arranged proximate said first column, wherein when said magnet is at the same level as one of said sensing devices, then said sensing device provides a proximate signal.

4. The apparatus of claim 3, wherein said sensing devices are Hall effect devices.

5. The apparatus of claim 1: wherein said first column is sized and configured to reduce the free surface of the fluid within the reservoir in order to amplify changes in fluid volume, wherein changes in small volumes of fluid within the reservoir can be detected by said measuring means.

6. The apparatus of claim 1, further comprising a temperature sensor, wherein compensation for thermal expansion and contraction of the fluid is provided.

7. The apparatus of claim 1, further comprising a second column, wherein the volume of the second column can be selectively added to said first column, whereby operating fluid volume changes are amplified to a lesser degree within said first column.

8. The apparatus of claim 1, wherein said first column is located substantially within the reservoir.

9. The apparatus of claim 1,
    a) wherein said measuring means comprises:

i) a magnet cooperatively connected to said float; and
ii) a plurality of sensing devices arranged proximate said first column, wherein when said magnet is at the same level as one of said sensing devices, said sensing device provides a proximate signal; and b) further comprising a temperature sensor, wherein compensation for thermal expansion and contraction of the fluid is provided.

10. An apparatus for measuring volume changes of hydraulic fluid in a reservoir tank, of the type utilized on a turf maintenance vehicle, the apparatus comprising:

a) a reservoir tank having one or more sides and a top, said tank containing fluid which defines a first volume of air between the surface of the fluid and said sides and top of said tank;

b) a first column, said first column having a first end extending through said reservoir, wherein said first column is in fluid communication with external atmosphere, and a second end arranged and configured to be located below the surface of the fluid level within said tank, whereby changes in the fluid volume in the tank increase or decrease the first volume of air thereby changing the air pressure which varies the fluid level within said first column;

c) measuring means for measuring the level of fluid within said first column and for generating a detect signal responsive to the level of fluid in said first column;

d) processing means for receiving said detect signal, wherein the level of the hydraulic fluid within said first column is determined, and for determining changes in the fluid volume; and e) electrically controllable fluid communication means, located through said tank, for venting the atmosphere within said tank to the external atmosphere, wherein the pressure between the two tends to equalize, whereby any elevated or decreased levels of fluid within said first column may be normalized and said first column is operable as a column with an increased measuring range.

11. The apparatus of claim 10, wherein said measuring means includes:

a) a float slidably located within said first column, wherein said float is arranged and configured to float at the surface level of the fluid;

b) a magnet cooperatively connected to said float; and c) a sealed column, located adjacent to and along at least a portion of said first column, said sealed column having a longitudinal axis and a plurality of Hall effect sensors arranged in a generally linear manner along said longitudinal axis, wherein said Hall effect sensors are arranged and configured to interact with said magnet and generate said detect signal when said magnet moves proximate said sensors.

12. The apparatus of claim 10, wherein said processing means determines when to vent the atmosphere by detecting a detect signal which is at or above a predetermined level within said first column and accumulates the levels before and after the fluid is normalized in order to detect leaks.

13. The apparatus of claim 10, further comprising a temperature sensor, wherein compensation for thermal expansion and contraction of the fluid is provided.

14. The apparatus of claim 10, further comprising a second column, wherein the volume of said first column can be increased to compensate for additional hydraulic fluid use.

15. The apparatus of claim 10, further comprising controller means for receiving information from a remote controller to improve the precision of the leak detector.

16. An apparatus for measuring the fluid volume in a reservoir having at least one wall, comprising:

a) a first column having a first end and second end, wherein said first end extends through the reservoir and is in fluid communication with the external atmosphere, wherein said second end extends beneath the surface of the fluid and is in fluid communication with the fluid and wherein said first column is substantially located within the reservoir;

b) measuring means for measuring the level of the fluid within said first column wherein said first column is sized and configured to reduce the free surface of the fluid within the reservoir in order to amplify changes in fluid volume, wherein small volume changes of fluid within the reservoir can be detected by said measuring means; and c) electrically controllable fluid communication means, located through a wall of the reservoir, for controllably venting the atmosphere within the reservoir to the external atmosphere, wherein the pressure within the reservoir moves toward equilibrium with the external atmosphere, whereby any elevated or decreased level of fluid within said first column may be normalized and said first column operates as a column with an increased measuring range.

17. The apparatus of claim 16, further comprising a) a temperature sensor operatively located within the fluid; and b) processing means, operatively connected to said measuring means, said controllable fluid communication means, and said temperature sensor, for determining the virtual level of the fluid, selectively operating said controllable fluid communication means, and compensating for temperature changes of the fluid.

18. The apparatus of claim 17, wherein said measuring means includes a float slidably engaged within said column, wherein said float moves within said tube in response to changes of levels of fluid within said sealed vessel.

19. The apparatus of claim 18, wherein said measuring means further includes:

a) a magnet cooperatively connected to said float; and b) a plurality of sensing devices arranged proximate said first column, wherein when said magnet is at the same level as one of said sensing devices, then said sensing device provides a proximate signal.

20. The apparatus of claim 19, wherein said sensing devices are Hall effect devices.

21. The apparatus of claim 20, wherein a gasket is used to provide fluid communication between said first and second column.

22. The apparatus of claim 16, further comprising a second column, wherein the volume of the second column can be selectively added to said first column, whereby operating fluid volume changes are amplified to a lesser degree within said column.

23. The apparatus of claim 16, further comprising controller means for receiving information from a remote controller to improve the precision of the leak detector.

24. The apparatus of claim 16, a) wherein said measuring means comprises:
i) a magnet cooperatively connected to said float; and
ii) a plurality of sensing devices arranged proximate said tube, wherein when said magnet is at the same level as one of said sensing devices, said sensing device provides a proximate signal; and b) further comprising a temperature sensor, wherein compensation for thermal expansion and contraction of the fluid is provided.

25. A hydraulic fluid system for a turf maintenance vehicle, comprising:

a) a reservoir for hydraulic fluid;

b) a pump in fluid communication with said reservoir;

c) a valve system for selectively placing hydraulic fluid from said pump in fluid communication with a work piece;

d) a return system for returning hydraulic fluid from said work pieces to said reservoir;

e) a first column having a first end and a second end, wherein said first end extends through the reservoir and is in fluid communication with the external atmosphere, and wherein said second end extends beneath the surface of the fluid and is in fluid communication with the fluid;

f) measuring means for measuring the level of the fluid within said first column; and g) electrically controllable fluid communication means, located through a wall of the reservoir, for venting the atmosphere within the reservoir to the external atmosphere; and h) wherein the pressure between within the reservoir is moves toward equilibrium with the external atmosphere, whereby any elevated or decreased levels of fluid within said first column may be normalized and said column operates as a virtual column.

26. The apparatus of claim 25, wherein said measuring means includes a float slidably engaged within said first column, wherein said float moves within said tube in response to changes of levels of fluid within said sealed vessel.

27. The apparatus of claim 26, wherein said measuring means further includes:

a) a magnet cooperatively connected to said float; and b) a plurality of sensing devices arranged proximate said first column, wherein when said magnet is at the same level as one of said sensing devices, then said sensing device provides a proximate signal.

28. The apparatus of claim 27, wherein said sensing devices are Hall effect devices.

29. The apparatus of claim 25 wherein said first column is sized and configured to reduce the free surface of the fluid within the reservoir in order to amplify changes in fluid volume, wherein changes in small volumes of fluid within the reservoir can be detected by said measuring means.

30. The apparatus of claim 25, further comprising a temperature sensor, wherein compensation for thermal expansion and contraction of the fluid is provided.

31. The apparatus of claim 25, further comprising a second column, wherein the volume may of the second column can be selectively added to said first column, whereby operating fluid volume changes are amplified to a lesser degree within said column.

32. The apparatus of claim 25, further comprising controller means for receiving information from a remote controller to improve the precision of the leak detector.

33. An apparatus for measuring the fluid volume in a reservoir having at least one wall, comprising:

a) a first column having a first end and a second end, wherein said first end extends through the reservoir and is in fluid communication with the external atmosphere, and wherein said second end extends beneath the surface of the fluid and is in fluid communication with the fluid;

b) measuring means for measuring the level of the fluid within said first column;

c) electrically controllable fluid communication means, located through a wall of the reservoir, for selectively venting the atmosphere within the reservoir to the external atmosphere, wherein the air pressure within the reservoir moves toward equilibrium with the external atmosphere when said controllable fluid communication means vent, whereby any elevated or decreased levels of fluid within said first column may be normalized and said column operates as a column with an increased measurement range; and d) a temperature sensor, wherein compensation for thermal expansion and contraction of the fluid is provided.

34. An apparatus for measuring the fluid volume in a reservoir having at least one wall, comprising:

a) a first column having a first end and second end, wherein said first end extends through the reservoir and is in fluid communication with the external atmosphere, wherein said second end extends beneath the surface of the fluid and is in fluid communication with the fluid and wherein said first column is substantially located with the reservoir;

b) measuring means for measuring the level of the fluid within said first column, wherein said first column is sized and configured to reduce the free surface of the fluid within the reservoir in order to amplify changes in fluid volume, wherein small volume changes of fluid within the reservoir can be detected by said measuring means; and c) a second column, wherein the volume of the second column can be selectively added to said first column, whereby operating fluid volume changes are amplified to a lesser degree within said first column.

* * * * *

UNITED STATES PATENT AND TRADEMARK OFFICE
CERTIFICATE OF CORRECTION

PATENT NO. : 5,744,701

DATED : APRIL 28, 1998

INVENTOR(S) : PETERSON ET AL.

It is certified that error appears in the above-identified patent and that said Letters Patent is hereby corrected as shown below:

At column 12, line 1, insert —1. Virtual level − (observed level + temperature)—.

Signed and Sealed this

Ninth Day of February, 1999

*Attest:*

*Attesting Officer*

*Acting Commissioner of Patents and Trademarks*